US007221750B2

(12) United States Patent
Brahmbhatt et al.

(10) Patent No.: US 7,221,750 B2
(45) Date of Patent: May 22, 2007

(54) INTELLIGENT ASSOCIATION OF NODES WITH PAN COORDINATOR

(75) Inventors: Deepali Apurva Brahmbhatt, San Jose, CA (US); Mark Enright, Soquel, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/335,954

(22) Filed: Jan. 20, 2006

(65) Prior Publication Data
US 2006/0116170 A1  Jun. 1, 2006

(51) Int. Cl.
*H04M 3/42* (2006.01)
*H04Q 7/20* (2006.01)

(52) U.S. Cl. .............................. 379/201.06; 379/201.1; 455/422.1

(58) Field of Classification Search ........... 379/201.06, 379/201.07, 201.09, 201.1; 455/422.1, 426.2, 455/560
See application file for complete search history.

(56) References Cited

U.S. PATENT DOCUMENTS

| 5,363,425 | A | * | 11/1994 | Mufti et al. ............ 379/201.06 |
| 5,414,759 | A | * | 5/1995 | Ishikuri et al. .......... 379/201.07 |
| 5,455,851 | A | * | 10/1995 | Chaco et al. ................. 379/38 |
| 5,515,426 | A | * | 5/1996 | Yacenda et al. ........ 379/201.07 |
| 5,533,113 | A | * | 7/1996 | Ozawa et al. ........... 379/201.07 |
| 5,822,418 | A | * | 10/1998 | Yacenda et al. ........ 379/201.07 |
| 6,446,043 | B1 | * | 9/2002 | Matsumoto et al. ............ 705/8 |
| 6,574,482 | B1 | * | 6/2003 | Radomsky et al. .......... 455/517 |
| 6,600,899 | B1 | * | 7/2003 | Radomsky et al. ........ 455/3.05 |
| 6,611,196 | B2 | * | 8/2003 | Mynatt et al. ................ 340/5.8 |
| 6,700,966 | B2 | * | 3/2004 | Takagi et al. .......... 379/201.06 |

OTHER PUBLICATIONS

Sastry, Naveen and Wagner, David, *Security Considerations for IEEE 802.15.4 Networks*, University of California, Berkeley, Wise'04, Oct. 1, 2004, Philadelphia, Pennsylvania.
Tunheim, Svein Anders, *Implementing an IEEE 802.15.4 and ZigBee Compliant RF Solution*, Chipcon AS, Oslo, Norway.
Koubaa, Anis, Alves, Mario, and Tovar, Eduardo, *Lower Protocol Layers for Wireless Sensor Networks: A Survey*, IPP Hurray! Technical Report, TR-051101, Version 1.0, Nov. 24, 2005, Porto, Portugal.

\* cited by examiner

*Primary Examiner*—Bing Q. Bui
(74) *Attorney, Agent, or Firm*—Mark J. Spolyar (57) ABSTRACT

Methods, apparatuses, and systems directed to managing wireless node access to one or more wireless networks. According to one implementation, a business logic application may function as a package tracking application to manage access to wireless access points in different WLANs along the route. A sensor node is initialized and configured with one or more connection parameter sets allowing it to associate with a given wireless network implemented by one or more access points. In one implementation, the sensor node is configured only to accept received wireless frames that it can properly decrypt using the currently stored encryption key. When the sensor node and such a wireless access point associate, they may exchange encrypted information (e.g., data regarding the package) using an encryption key. Before the sensor node disassociates with time wireless access point, the wireless access point transmits a new connection parameter set to the sensor node.

21 Claims, 7 Drawing Sheets

INTELLIGENT ASSOCIATION OF NODES WITH PAN COORDINATOR

CROSS-REFERENCE TO RELATED APPLICATIONS AND PATENTS

This application makes reference to the following commonly owned U.S. patent applications and/or patents, which are incorporated herein by reference in their entirety for all purposes:

U.S. patent application Ser. No. 10/407,584 in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 11/195,536 in the name of Brian Cox, Bruce McMurdo and Anuradha Gade, entitled "Method and System for Dynamic Assignment of Wireless LAN Access Point Identity."

FIELD OF THE INVENTION

The present invention relates to wireless networks and, more particularly, to methods, apparatuses, and systems directed to coordinating and managing associations in wireless networks.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role that WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their networks.

In package delivery systems, a WLAN may include a personal area network (PAN) to monitor physical packages (e.g., mail or goods) as packages travel from one location to another. A PAN is a short-range (e.g., within 10 meters) wireless network, which may be a part of a WLAN, and is used for communication among wireless clients (e.g., notebook computers, personal assistant devices, sensor nodes, etc.). A wireless client typically includes an application for selecting and joining a network such as a PAN. While the package is on route, PANs along the route facilitate in tracking the package by tracking a sensor node that is attached to the package. More specifically, as the package travels from one PAN to another, the sensor node on the package associates and disassociates with particular wireless access points in each PAN. While a package is associated with a given PAN, the PAN infrastructure tracks the package by reading information that is stored in the sensor node. Such information may be, for example, information about the sensor node and information about the package.

In accordance with the IEEE 802.15.4 specification, a sensor node can perform active or passive scanning to associate with wireless access points in a given PAN. During active scanning, the sensor node sends out a probe request frame, requesting wireless access points to respond. The surrounding wireless access points that can allow an additional sensor node to join, respond to the request. The sensor node chooses one network to join from the list. During passive scanning, the sensor node receives surrounding beacon frames that wireless access points broadcast, and responds to one of the beacon frames in order to join the PAN. With either passive or active scanning, the sensor node ultimately determines which PAN to join.

This situation may not be desirable when a sensor-node is moving between overlapping areas of network coverage, and it is desired that the sensor-node move from one network to another specified network. In addition, for various reasons, it may be desirable to have the sensor-node skip certain associations and join only specific networks. In addition, problems may exist when a sensor node may associate with the wrong, or an undesired, PAN (e.g., an unauthorized or rogue PAN, or a PAN outside of a given administrative domain, etc.). An incorrect association may occur for, example, if the package carrying the sensor node is misrouted or moves into an area that is covered to by two different PANs. If the sensor node stores any sensitive information, an unauthorized or rogue PAN infrastructure may intercept the sensitive information.

In light of the foregoing, a need in the art exists for methods, apparatuses, and systems that address the foregoing problems and that effectively manage access of sensor nodes in wireless networks. Embodiments of the present invention substantially fulfill this need.

DESCRIPTION OF PREFERRED EMBODIMENT(S)

A. Overview

The present invention provides methods, apparatuses, and systems directed to managing wireless node access to one or more wireless networks. Embodiments may apply to various applications including package delivery where a sensor node is attached to a physical package (e.g., mail or goods) that is shipped to a particular destination. As such, the package may be tracked via the sensor node as the sensor node travels to one or more intermediary destinations, which include wireless access points or other suitable mechanisms, on route towards a final destination. According to one implementation of the present invention, a business logic application may function as a package tracking application to manage access to wireless access points in different WLANs along the route. As described in more detail below, a sensor node is initialized and configured with one or more connection parameter sets allowing it to associate with a given wireless network implemented by one or more access points. In one implementation, the connection parameter set includes 1) security credentials, which may include, for example, a network pass-phrase for authentication, and/or a network identification (network ID) that identifies the wireless network to which the sensor node may associate, 2) an encryption key that enables the sensor node and the wireless access point to establish a security association and exchange encrypted information, and 3) a frequency identifier corresponding to the frequency channel enabling the sensor node and the wireless access point to communicate. Optionally, the business logic application also provides the connection parameter set to one or more wireless access points. In one implementation, the sensor node is configured only to accept received wireless frames that it can properly decrypt using the currently-stored encryption key. Accordingly, until the sensor node comes within radio contact of a wireless access point or other wireless node configured with the same encryption key, it does not establish a wireless connection. When the sensor node and such a wireless access point associate, they may exchange encrypted information (e.g., data regarding the package) using the encryption key. Before the sensor node disassociates with the wireless access point, the wireless access point transmits a new connection parameter set to the sensor node. This new connection parameter set includes a network ID for another wireless network. In addition, the new connection parameter set also includes an encryption key and a frequency identifier. In one implementation, the sensor node re-initializes itself using the new connection parameter set information. This process may continue until the sensor node arrives at its final destination and, in this manner, the wireless networks with which the sensor node associates may be controlled.

B. Exemplary Wireless Network System Architecture

B.1. Network Topology

Figure 1:
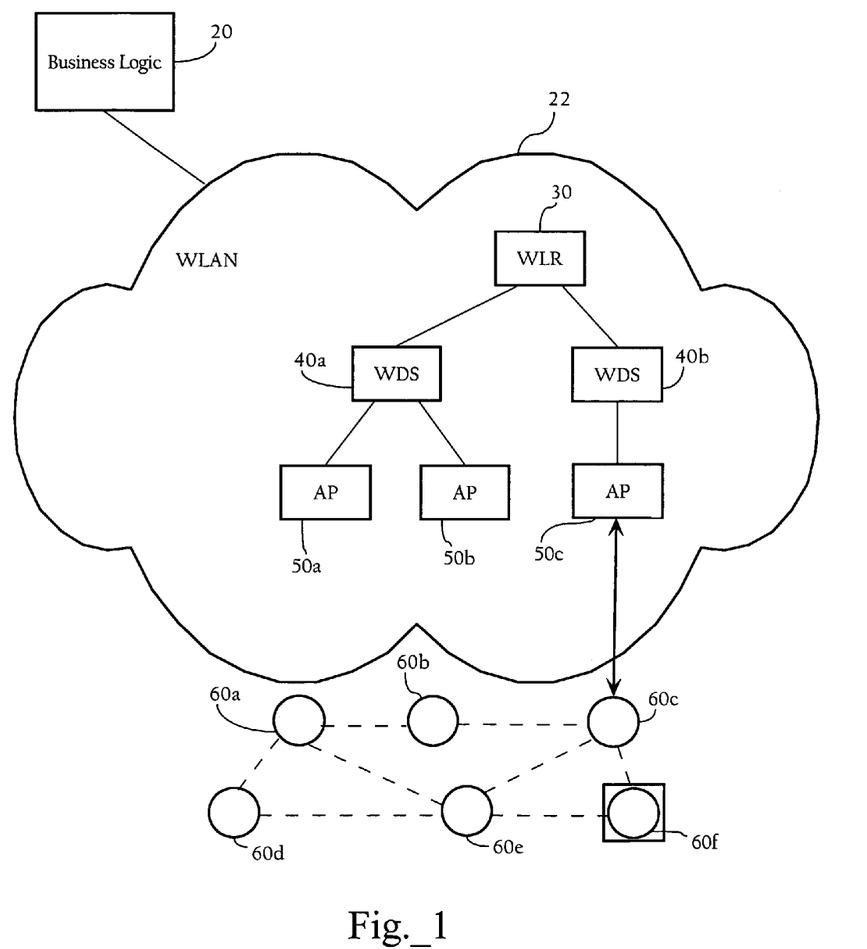
FIG. 1 is a topological diagram of the components in a wireless local area network (WLAN) system according to one implementation of the present invention.

A network environment including a wireless local area network (WLAN) according to one implementation of the present invention is shown in FIG. 1. In a specific embodiment of the present invention, the system includes business logic 20, a wireless local area network (WLAN) 22, a WLAN command reference (WLR) unit 30, wireless domain services (WDS) controllers 40a and 40b, and wireless access points 50a, 50b, and 50c (collectively referred to as wireless access points 50), and sensor nodes 60a, 60b, 60c, 60d, 60e, and 60f (collectively referred to as sensor nodes 60). In one implementation, all elements or portions of WLAN 22 may support a personal area network (PAN). For example, wireless access points 50a, 50b, and 50c, and sensor nodes 60a, 60b, 60c, 60d, and 60e may be a part of a PAN. Business logic 20 broadly refers to a vast array of work flows and processes (such as package tracking, vehicle tracking, etc.) that can be implemented in connection sensor nodes 60a, 60b, 60c, 60d, and 60e. In one implementation, business logic 20 is implemented as one or more computer applications executed on one or more computing devices, such as network servers.

In one implementation, the PAN may be implemented as a mesh network or may include a mesh network. If a mesh network is implemented, the mesh network may be a full mesh network, where all sensor nodes 60 are connected directly to all others, or a partial mesh network, where only some sensor nodes 60 are connected directly to some other nodes. Some of the sensor nodes may be mobile and change their position in time and space. Dynamic addition and deletion of sensor node connections is by default available in the infrastructure. A benefit of mesh networks is that they allow links to fail and re-configure themselves to new links found within the network.

Some elements, such as sensor node 60f (distinguished with a square around a circle), for example, may not be part of the PAN. As such, each sensor node 60a, 60b, 60c, 60d, and 60e may access WLAN 22 directly or via peer sensor nodes, but sensor node 60f may not. As described above, a connection parameter set enables a given sensor node to associate with a given wireless network implemented by one or more wireless access points and, in mesh networks, one or more peer sensor nodes.

WLAN 22, in one implementation, generally refers to a computer network that includes wired and wireless network elements, including one or more intermediate network devices (e.g., routers, switches, etc.) that allow for the transmission of messages among the elements of WLAN 22 and sensors nodes 60. While WLAN 22 may include a variety of network segments, transmission technologies and components, such as terrestrial WAN links, satellite links, optical fiber links, and cellular links, WLAN 22 could also be a campus LAN. The wireless access points 50 are typically connected to switch ports via Ethernet links; however, other link layer connection protocols or communication means can be employed. FIG. 1 illustrates one possible network environment in which the invention may operate; however, other implementations are possible. For example, although business logic 20 is illustrated as being generally connected to WIAN 22, business logic 20 may be co-located with any one or more of wireless access points 50. In other words, business logic 20 may reside on a network device in any suitable location. Business logic communicates with wireless access points 50 of WLAN. Business logic 20 may also communicate with remote wireless access points connected to other networks over a wide area network or the Internet.

Wireless access points 50 are operative to wirelessly communicate with remote sensor nodes 60. In one implementation, the wireless access points 50 implement the wireless network protocol specified in the IEEE 802.11 WLAN specification and/or the IEEE 802.15.4 specification. Wireless access points 50 may be autonomous or so-called "fat" wireless access points, or light-weight wireless access points operating in connection with a wireless switch (not illustrated), as disclosed in U.S. patent application Ser. No. 10/407,584. In addition, the network infrastructure may also include a Wireless LAN Solution Engine (WLSE) offered by Cisco Systems, Inc. of San Jose, Calif. or another wireless network management system. In some implementations, the network infrastructure may also include one or more Wireless Control System (WCS) nodes operative to manage one or more wireless switches and access points. Furthermore, U.S. patent application Ser. No. 11/195,536 discloses methods and systems for automatically assigning an identity to, and configuring, wireless access points 50. Of course, configuration and management information can be obtained in a variety of manners without departing from the scope of the present invention.

B.2. Wireless Access Point

Figure 2:
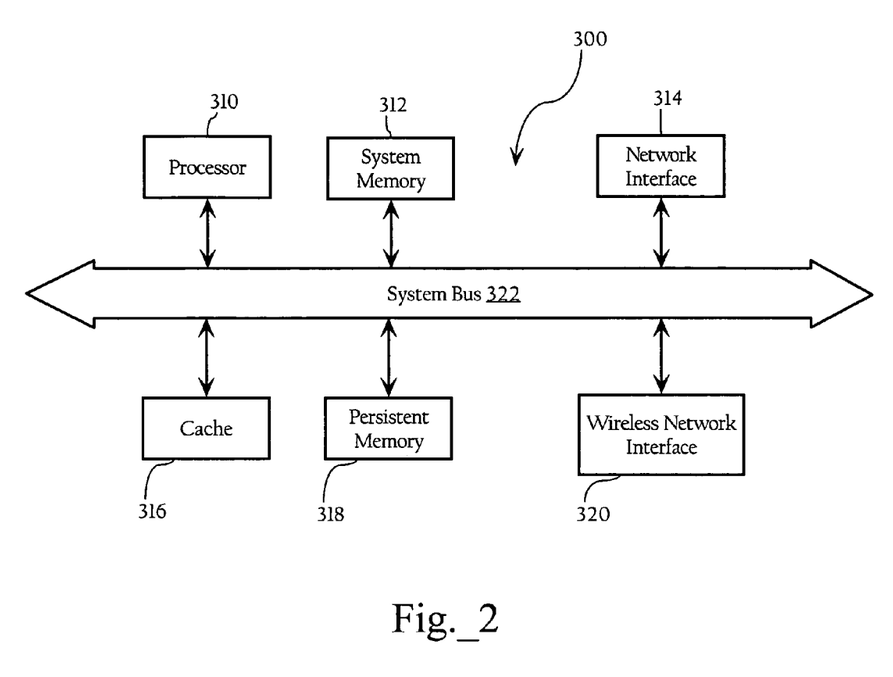
FIG. 2 illustrates for didactic purposes a hardware system, which may be used to implement a wireless access point.

FIG. 2 illustrates for didactic purposes a hardware system 300, which may be used to implement a wireless access point 50. In one implementation, the wireless access point 300 comprises a processor 310, a memory 312, a network interface 314 (e.g., an 802.3 interface) for communication with a LAN, a cache 316 for storing VLAN information, a persistent memory 318, a wireless network interface 320 (e.g., an IEEE 802.11 WLAN interface) for wireless communication with one or more wireless clients 60, and a system bus 322 interconnecting these components. The wireless access points 50 may also include software modules (including Dynamic Host Configuration Protocol (DHCP) clients, transparent Bridging, Lightweight Access Point Protocol (LWAPP), Cisco® Discovery Protocol (CDP) modules, wireless access point modules, Simple Network Management Protocol (SNMP) functionality, etc.) and device drivers (e.g., network and WLAN interface drivers) stored in persistent memory 318 (e.g., a hard disk drive, flash memory, etc.). At start up, these software components are loaded into system memory 312 and then accessed and executed by processor 310.

B.3. Sensor Node

Figure 3:
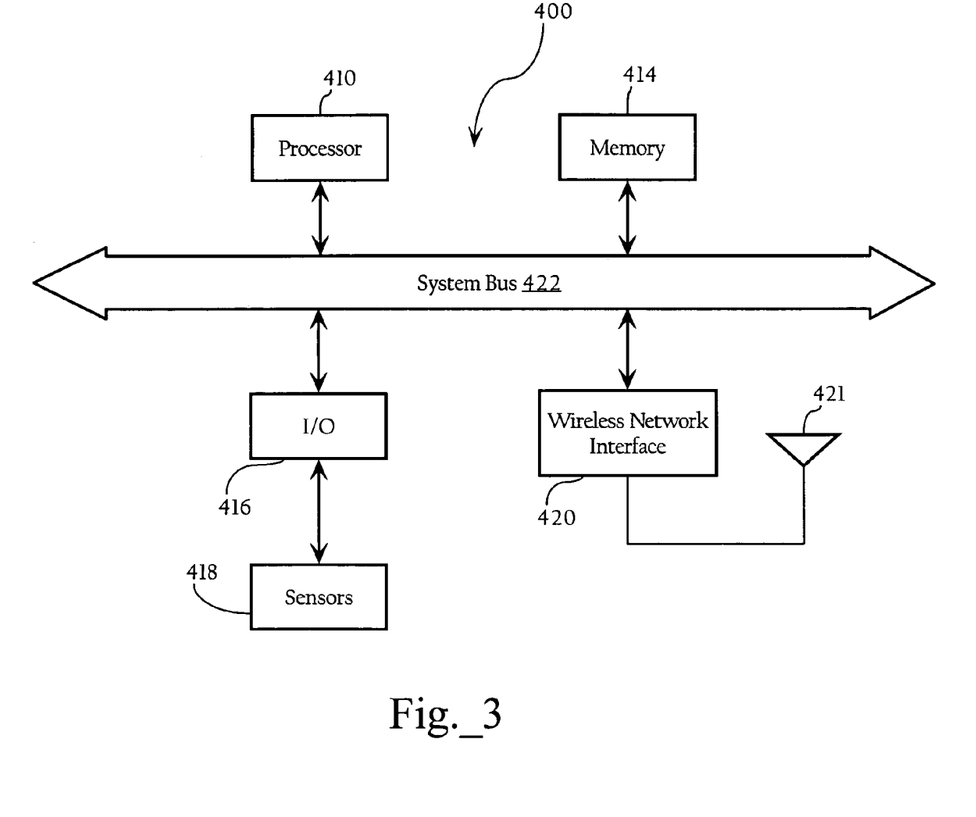
FIG. 3 illustrates for didactic purposes a hardware system, which may be used to implement a sensor node.

FIG. 3 illustrates for didactic purposes a hardware system 400, which may be used to implement a sensor node 60. In one embodiment, hardware system 400 includes a processor 410, memory 414, input/output (I/O) ports 416, sensors 418, a wireless network interface 420, an antenna 421, and a system bus 422. In one implementation, process 410 may be a low-end microcontroller with limited processing power to conserve power, and sensors 418 may be low-end sensors for short-range access to wireless networks. In one implementation, sensors 418 may include one or more of heat sensors, motion sensors, telemetry sensors, global positioning system (GPS) sensors, and orientation sensors. The elements of hardware system 400 are described in greater detail below. In particular, wireless network interface 420 provides communication between hardware system 400 and any of a wide range of wireless networks, such as a WLAN (i.e., IEEE 802.11), PAN (802.15.4), WiMax (i.e., IEEE 802.16), Cellular (e.g., GSMA), etc. Memory 414 provides storage for the data and programming instructions when executed by processor 410. I/O ports 416 are one or more serial and/or parallel communication ports that provide communication between additional peripheral devices, which may couple to hardware system 400.

Hardware system 400 may include a variety of system architectures; and various components of hardware system 400 may be rearranged. For example, memory 414 may be on-chip with processor 410. Alternatively, memory 414 and processor 410 may be packed together as a "processor module," with processor 410 being referred to as the "processor core." Furthermore, certain implementations of the present invention may not require nor include all of the above components. Furthermore, hardware system 400 may include additional components, such as additional processors, storage devices, or memories.

In one embodiment, the operations of sensor node are implemented as a series of software routines run by hardware system 400. These software routines, some or all of which can be embodied in a wireless network interface driver, comprise a plurality or series of instructions to be executed by a processor in a hardware system, such as processor 410. Initially, the series of instructions are stored on a storage device, such as memory 414. However, the series of instructions can be stored on any suitable storage medium, such as a diskette, CD-ROM, ROM, etc. Furthermore, the series of instructions need not be stored locally, and could be received from a remote storage device, such as a server on a network, via wireless network interface 420. The instructions are copied from the storage device, such as memory 414, and then accessed and executed by processor 410. In alternate embodiments, the present invention is implemented in discrete hardware or firmware.

While FIG. 3 illustrates, for didactic purposes, the hardware architecture of a sensor node according to one implementation of the present invention, the present invention can, however, be implemented on a wide variety of computer system architectures, such as dual-mode cellular phones (e.g., cellular plus 802.11 capable devices), wireless VoIP phones, Personal Digital Assistants (e.g., converged devices which support WLAN data+voice and cellular), Laptop computers, and the like. An operating system manages and controls the operation of hardware system 400, including the input and output of data to and from software applications (not shown). The operating system provides an interface, such as a graphical user interface (GUI), between the user and the software applications being executed on the system. According to one embodiment of the present invention, the operating system is the Windows® 95/98/NT/XP operating system and/or Windows® CE (WinCE) operating system, available from Microsoft Corporation of Redmond, Wash. However, the present invention may be used with other operating systems, such as the Apple Macintosh Operating System, available from Apple Computer Inc. of Cupertino, Calif., UNIX operating systems, LINUX operating systems, Symbian operating systems, and the like.

C. Basic Personal Area Network Environment

Figure 4:
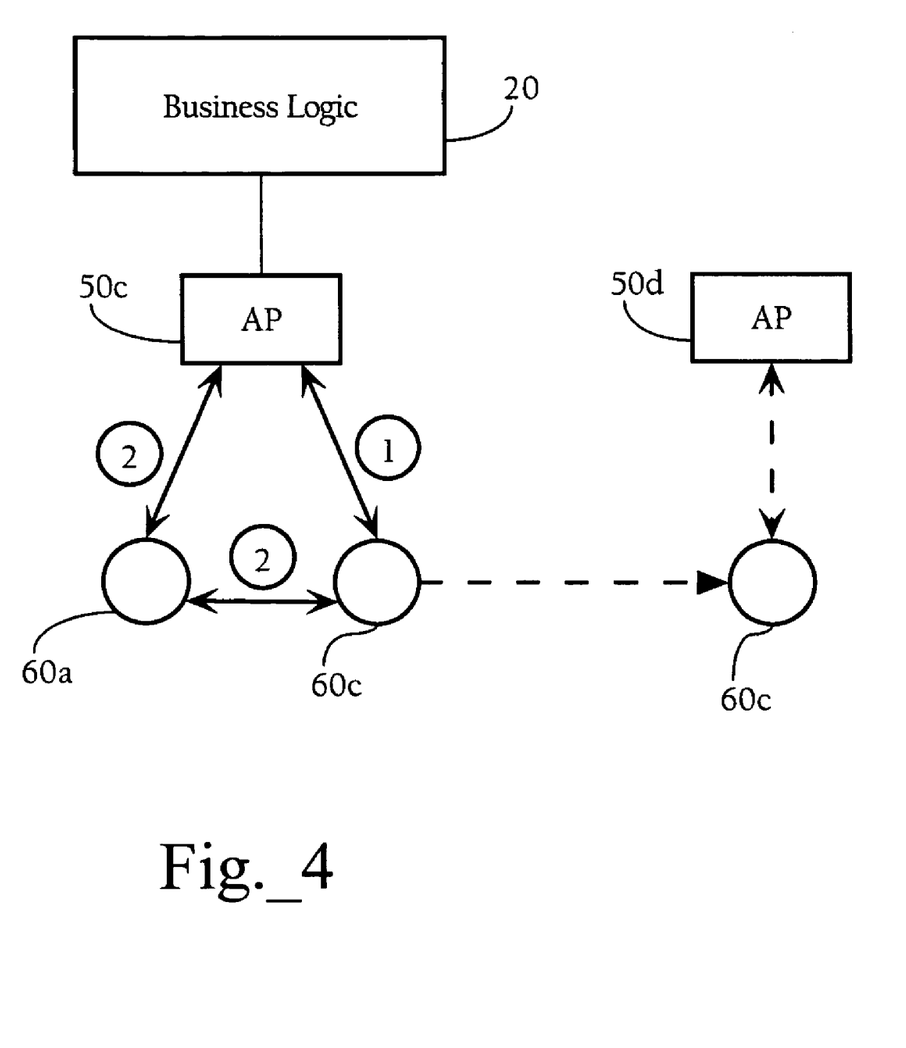
FIG. 4 is a network environment implementing a personal area network (PAN) according to one implementation of the present invention.

FIG. 4 is a network environment implementing a personal area network (PAN) according to one implementation of the present invention. As FIG. 4 illustrates, business logic 20 operatively couples to wireless access point 50c, and wireless access point 50c communicates with sensor nodes 60a and 60c. As described above, business logic 20 may reside in any suitable location. For example, business logic 20 may reside in wireless access point 50c or alternatively in a central controller or server (not shown). The following example illustrates a scenario where sensor node 60c is attached to a physical package in order to facilitate tracking the package as it travels towards its final destination. As FIG. 4 illustrates, sensor node 60c may communicate directly with wireless access point 50c (Ref No. 1), or indirectly via peer sensor node 60d (Ref. No. 2). As discussed in more detail below, in one implementation, sensor node 60c first associates with wireless access point 50c and may be re-configured to the associate with a different wireless network implemented by wireless access point 50d. For ease of illustration, only two wireless access points 50c and 50d and two sensor nodes 60a and 60c are shown. Implementations described herein may involve numerous wireless access points and numerous sensor nodes, as well as other intermediate systems (e.g., wireless switches, WDS controllers, etc.) between the wireless access points 50c and 50d and business logic 20.

C.1. Connection Parameter Set and Initialization of Sensor Node

As discussed in more detail below, the connection parameter set, in one implementation, includes security credentials (e.g., network pass-phrase), an encryption key (or set of encryption keys, such as a unicast session key, and a broadcast session key), and a frequency identifier. In one implementation, each wireless access point 50 encrypts wireless management frames (e.g., beacon frames, probe response frames, association response frames, etc.) using an encryption key. In mesh network implementations, a common encryption key may be used to enable sensor node 60c to communicate with peer sensor nodes. In still other embodiments, the connection parameter set may include a group or broadcast key, and a pairwise master key (which can be used by the sensor node and the wireless access point to generate session keys). In one implementation, business logic 20 provides the connection parameter sets according to a route plan. The route plan, for example, may contemplate that sensor node 60c travels through one or more intermediary PANs (or other wireless networks) before sensor node 60c arrives at its final destination. In one implementation, business logic 20 may indicate an ordered series of wireless access points with which sensor node 60c may associate. Business logic 20 may, for example, cause sensor node 60c to skip or make certain associations with particular wireless access points.

As described in more detail below, sensor node 60c associates with a series of wireless networks implemented in the example described herein by access points 50c and 50d. Initially, sensor node 60c has a connection parameter set that enables sensor node 60c to associate with wireless access point 50c (i.e., the first wireless access point along the route). Business logic 20, via wireless access point 50c, then provides sensor node 60c with a new connection parameter set associated with wireless access point 50d (i.e., the next wireless access point on the route). This process continues until sensor node 60c (and the package) arrives at the final destination.

Before sensor node 60c travels towards the final destination, business logic 20, or some other process, initializes sensor node 60c. In one implementation, initialization may occur at compile time while business logic 20, or some other process, loads firmware onto sensor node 60c. Alternatively, initialization may occur at run time by using a physical serial port connection between sensor node 60c and a controller. In one implementation, communication between sensor node 60c and the controller may include mechanisms that allow only write operations and would not allow read operations/access to the connection parameter data.

During the initialization, business logic 20 transmits connection parameter data to sensor node 60c. As described above, the connection parameter data enables sensor node 60c to associate with the next wireless access point 50c on the route. In one implementation, the business logic also provides sensor data to the sensor node, such as information (e.g., identification) about sensor node 60c and/or information (e.g., content, final destination, etc.) about the package to which sensor node 60c is attached. In one implementation, the connection parameter set includes one or more of 1) a network ID that identifies a wireless network, 2) an encryption key that enables sensor node 60c and wireless access point 50c to establish a security association and exchange encrypted information, and a frequency identifier corresponding to the frequency channel or band used by the wireless access points implementing the wireless network.

In one implementation, wireless access point 50c may include a high-end processor for generating encryption keys based on information from business logic 20. Wireless access point 50c may then associate each encryption key with a different connection parameter set and corresponding sensor node. In one implementation, wireless access point 50c may optionally generate multiple encryption keys for different functions. For example, one encryption key may be a unicast key for communicating with a particular sensor node (e.g., sensor node 60c). Wireless access point 50c may also generate a broadcast key for encrypting wireless management frames, such as beacon frames. As described in more detail below, another encryption key may enable wireless access point 50c to function as a backup wireless access point. As such, if another sensor node that gets misrouted with its package to the PAN associated with wireless access point 50c, wireless access point 50c can at least communicate with the misrouted sensor node to determined that it was indeed misrouted. A wireless access point that does not have the encryption key (or that could not generate the encryption key) would not be able to associate with sensor node 60c. This would prevent a rogue (or other unauthorized) wireless access point from associating with sensor node 60c.

C.2. Association with Wireless Access Point

Figure 5:
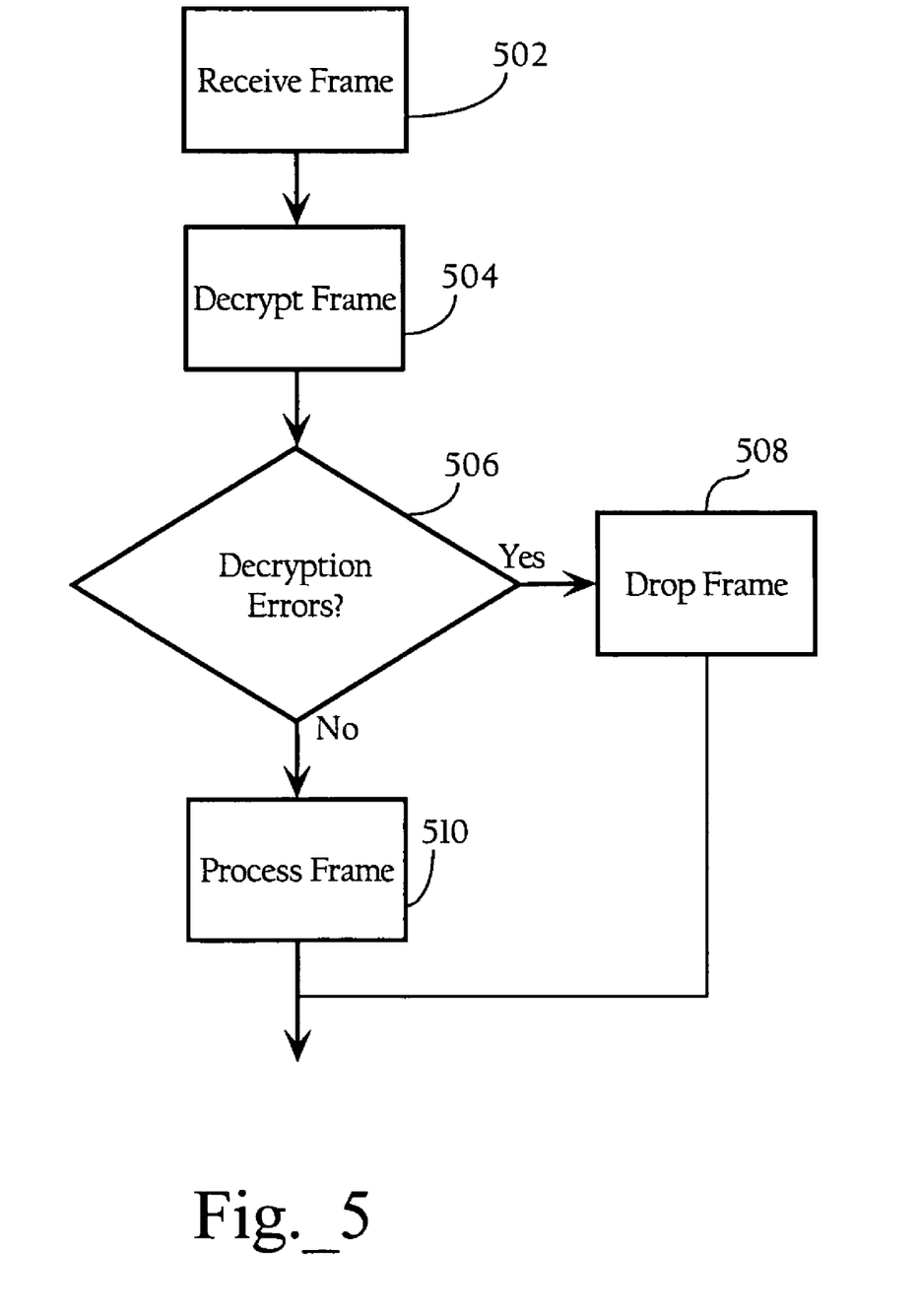
FIG. 5 is a flow chart illustrating a process flow, according to one implementation of the present invention, implemented at a sensor node.

FIG. 5 is a flow chart illustrating a process flow, according to one implementation of the present invention, implemented at a sensor node. In one implementation, sensor node 60c either actively or passively scans for the network identified in the connection parameter set with which it has been currently configured. In one implementation, sensor node 60c tunes its radio to the frequency identified in the connection parameter set. In another implementation, sensor node 60c scans all available channels in an identified frequency band. As FIG. 5 illustrates, sensor node 60c decrypts all received frames and drops frames that generate decrypt errors. Specifically, sensor node 60c receives a frame (502) from wireless access point 50c. In one implementation, the frame is a beacon frame that wireless access point 50c broadcasts to advertise the wireless network. In one implementation, sensor node 60c receives the frame in accordance with the IEEE 802.15.4 specification, which provides guidelines as to how a sensor node may communicate with other elements in a wireless network. For example, if encryption is involved, encryption occurs at the media access control (MAC) level. Sensor node 60c then decrypts the frame (504). Sensor node 60c then determines if there are decryption errors (506). If so, sensor node 60c drops the frame (508). If not, sensor node 60c processes the frame (510). Processing the frame may involve, for example, determining whether the network ID in the beacon frame matches the connection parameter set, or responding to requests from wireless access point 50c. In this manner, sensor node 60c only associates with wireless access points 50 that have the appropriate security credentials (e.g., the correct encryption keys and network identifiers). For example, since in the didactic example, wireless access point 50c includes the appropriate encryption key, sensor node 60c will be able to associate with it, allowing a network application (such as a package tracking application) to exchange data with the sensor node 60c.

In one implementation, sensor node 60c and wireless access point 50c may exchange the network ID at that the network/application layer, and the exchange may follow various standard challenge/response scenarios. For example, in one implementation, sensor node 60c may, at initialization, be configured with a random nonce. In one implementation, the wireless access point 50, and/or the business logic 20, are also configured with knowledge of the random nonce. In such an embodiment, the sensor node 60c may send a pre-initialized random nonce challenge nounce to wireless access point 50c. Wireless access point 50c may respond with a random nounce that is encrypted with the encryption key. Accordingly, if sensor node 60c can validate the nonce challenge response since it has been configured with the nonce. If the nonce challenge response is valid, sensor node 60c, in one implementation, would then transmit the network ID to wireless access point 50c. Still further, the network ID may be used in a manner similar to a one-time password. For example, the business logic 20 (or the wireless access point 50) may maintain a list of network IDs that are currently acceptable. Once a network ID has been transmitted by the sensor node 60c, it is taken off the list of acceptable network IDs to prevent a rogue sensor node from using it in a replay attack. In addition, each network ID may have a time limit before it expires.

Referring again to FIG. 4, after sensor node 60c associates with wireless access point 50c, sensor node 60c and a network application may exchange information via wireless access point 50c. For example, a network application may receive or request sensor data from the sensor node 60c. In one implementation, the sensor data (in addition to the wireless management frames) are encrypted for security. Accordingly, if the sensor data includes any sensitive information, only a wireless, access point having the same encryption key as the sensor would be able to access the sensor data.

As FIG. 4 illustrates, sensor node 60c may communicate directly with wireless access point 50c, since sensor node 60c has the required connection parameter set and wireless access point 50c has the required encryption key. This communication link is indicated by an encircled "1." Alternatively, in one implementation, sensor node 60c may communicate indirectly with wireless access point 50c via sensor node 60a. This assumes that sensor node 60a also has the required connection parameter set. The communication links between sensor nodes 60c and 60a and between sensor node 60a and wireless access point 50c are each indicated by an encircled "2." Referring the communication link between the sensor nodes 60a and 60c in one implementation, the IEEE 802.15.4 specification provides a general mesh protocol that enables sensor nodes 60a and 60c to communicate with each other. In one implementation, a common encryption key is used in a given wireless network to allow communications between peer sensor nodes to be encrypted.

Wireless access points 50c and 50d may or may not belong to the same PAN or be in the same geographical locations. This example presumes that wireless access points 50c and 50d implement different PANs in the same location or different locations. Wireless access points 50c and 50d would thus have different connection parameter sets in this example, since at least their network IDs would be different. Accordingly, sensor node 60c would not be able to access wireless access point 50d until sensor node 60c has been configured with the appropriate connection parameter set.

C.3. Association with the Second Wireless Access Point

In one implementation, before sensor node 60c disassociates with wireless access point 50c and travels to wireless access point 50d, wireless access point 50c transmits to sensor node 60c a new connection parameter set corresponding to another wireless network, such as that implemented by wireless access point 50d. In one implementation, the new connection parameter set includes a network ID for wireless access point 50d, an encryption key that enables sensor node 60c and wireless access point 50d to establish a security association and exchange information, and a frequency identifier. In one implementation, business logic 20 provides the new connection parameter set to be provided to the sensor node. This new connection parameter set may vary depending on the intended route for the sensor node 60c.

Figure 6:
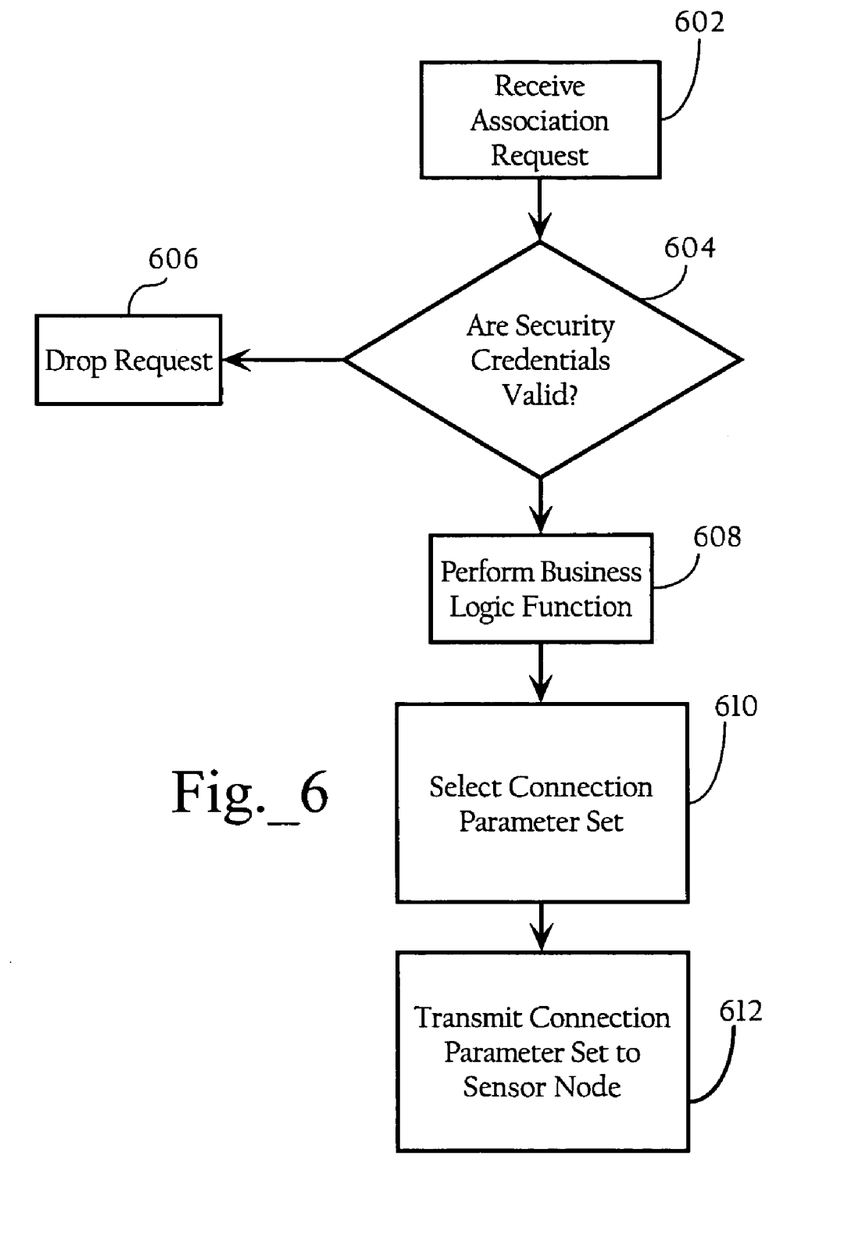
FIG. 6 is a flow chart illustrating a process flow, according to one implementation of the present invention, implemented at a wireless access point.

FIG. 6 is a flow chart illustrating a process flow, according to one implementation of the present invention, implemented by the business logic 20. In one implementation, wireless access point 50c may have access to one or more connection parameter sets, each associated with a different sensor node, a different wireless network, or route plan. Wireless access point 50c receives an association request (602) and determines whether the security credentials in the association request are valid (604). In one implementation, the security credentials may be a group ID, network ID, and/or random nonce challenge, etc. If the security credentials are not valid, wireless-access point 50c drops the association request (606). Accordingly, a wireless node (e.g., a rogue node) without valid security credentials would not be able to join the wireless network. Business logic 20 then performs business logic functions (608) and selects an appropriate connection parameter set (610) for sensor node 60c and then transmits the connection parameter set to sensor node 60c (612). With the new parameter set, sensor node 60c will have the network ID, encryption key, and frequency required to communicate with wireless access point 50d at the next destination. The following describes a process where sensor node 60c receives the new connection parameter set. The new connection parameter set can be provided at almost any stage during the current association between wireless access point 50c and sensor node 60c.

Figure 7:
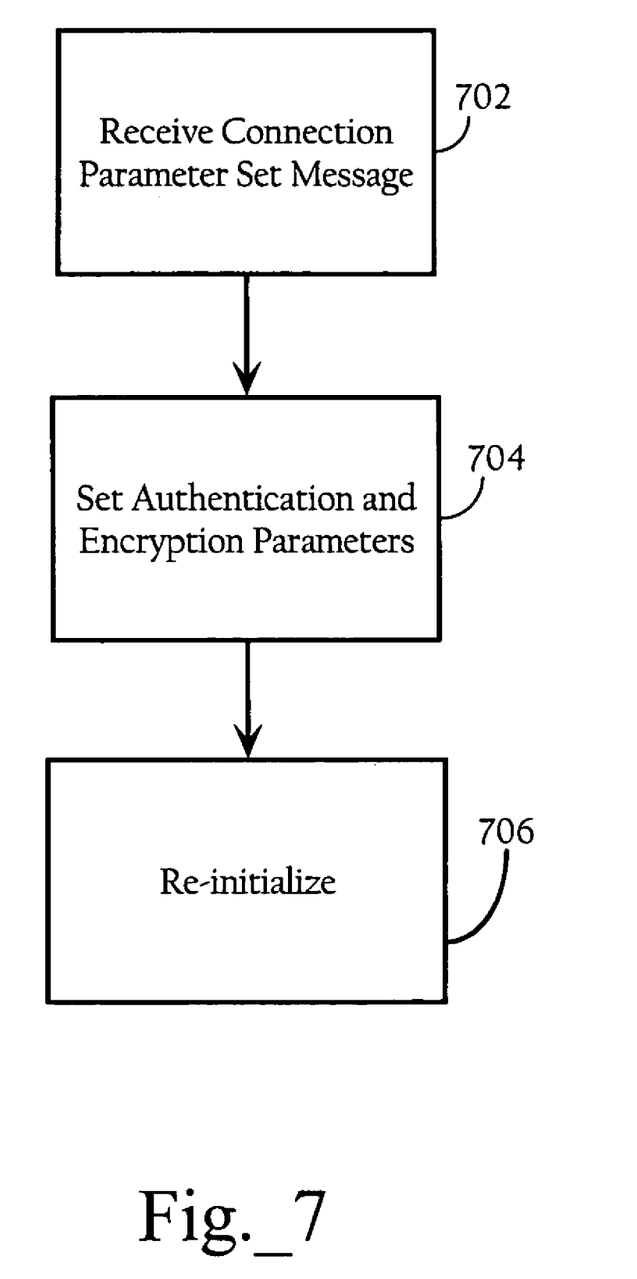
FIG. 7 is a flow chart illustrating a process flow, according to one implementation of the present invention, implemented at a sensor node.

FIG. 7 is a flow chart illustrating a process flow, according to one implementation of the present invention, implemented at a sensor node. Sensor node 60c receives a connection parameter set message (702) from wireless access point 50c. In one implementation, the connection parameter set message includes the connection parameter set, such as the network ID, encryption key, and frequency for associating with wireless access point 50d at the next destination. Sensor node 60c then sets authentication and encryption parameters (704) and re-initializes (706) to the new connection parameter set. Because wireless access point 50c provides the new connection parameter set to sensor node 60c, sensor node 60c would not be able to associate with wireless access point 50d until after first associating wireless access point 50c. This ensures that sensor node 60c associates with wireless access points 50c and 50d in a particular order. This process described above may be repeated a desired number of times until sensor node 60c arrives at its final destination.

D. Security Protocol

Embodiments, as described above, may operate in accordance with the IEEE 802.15.4 and/or the 802.11 specification. Accordingly, sensor node 60c may perform active or passive scanning when attempting to join a network, as discussed above. In one implementation, wireless access points 50 encrypt the beacon frames using a common or broadcast encryption key. Accordingly, a sensor node having a connection parameter set with the required encryption key can receive and decrypt the beacon frame sent by the wireless access point having the same encryption key. The sensor node may then respond accordingly to associate with the wireless access point. In active scans, the sensor node would transmit encrypted probe requests, which would be dropped by wireless access points that have not been configured with a matching encryption key. A sensor node that does not have the required encryption key or the proper frequency would not be able to associate with the wireless access point. In one implementation, the beacon frames do not provide the network ID. As such, if a sensor node does not have the required connection parameter set, the sensor node would not be able to provide the correct network ID to the wireless access point, and thus would not be able to associate with the wireless access point. This provides a security check to ensure that the sensor node is a valid (i.e., authorized) sensor node.

In one implementation, if the network ID from sensor node 60c does not match that of the wireless access point, the wireless access point may transmit a negative response to sensor node 60c indicating that the association request has been denied. In one implementation, sensor node 60c may have no means of determining why it was rejected, as there may be a number of reasons for rejection. For example, a rejection may be due to a resource shortage at the wireless access point or due to a network ID mismatch. This prevents rogue sensor nodes from repeatedly attempting to associate with a given wireless access point, flooding the wireless access point with data, and/or attacking the wireless access point.

If sensor node 60c moves into an area that is covered by two different PANs, the wireless access points (also known as PAN coordinators) in the PANs will determine with which wireless access point the sensor node may associate, according to the connection parameter set provided by business logic 20. As such, sensor node 60c will not associate with an unauthorized or a rogue PAN. Accordingly, if sensor node 60c stores any sensitive information, an unauthorized or rogue wireless access point could not intercept the sensitive information. This provides other safety benefits. For example, a given package may contain valuables while another package may contain medical information. Even within the same organization (e.g., a hospital), it may be undesirable for the package with valuables to associate with a PAN that is collecting medical information. Implementations described above ensure that packages are delivered to the correct destinations.

Also, if sensor node 60c is attached to a package that is lost or stolen, the sensor data in sensor node 60c would be secure, because the encryption key would be required to retrieve the sensor data. In one implementation, if sensor node 60c is attached to a package that is misrouted to an incorrect wireless access point, the incorrect wireless access point would not be able to associate with sensor node 60c, and thus would not be able to retrieve sensor data from the sensor node 60c. As described above, in one implementation, one or more backup wireless access points at each PAN may be designated to handle misrouted or lost packages. For example, in one implementation, each sensor node 60c may have an optional backup encryption key that is triggered in the absence of the intended wireless access point and in the presence of a backup wireless access point.

Embodiments may also be extended for Lightweight Access Point Protocol (LWAPP) specifications. Using an LWAPP, sensor node 60c may determine, based on discovery responses, which wireless access point to associate with. In the discovery request, the sensor node may include a message that includes a network ID. Only a wireless access point having a network ID that matches the network ID in the discovery request would respond with a discovery response. In one implementation, link layer messages, which would include a connection parameter set, may be encrypted for security. In other words, as sensor node 60c travels from one wireless access point to another, each new connection parameter set that sensor node 60cd receives would be encrypted.

The present invention has been explained with reference to specific embodiments. For example, while embodiments of the present invention have been described as operating in connection with IEEE 802.11 networks and the IEEE 802.15.4 standard, the present invention can be used in connection with any wireless network environment. While embodiments described above can be usedin connection with a package tracking application above, the present invention may be applied to a variety of applications involving mobile nodes. Other embodiments will be evident to those of ordinary skill in the art. It is therefore not intended that the present invention be limited, except as indicated by the appended claims.

What is claimed is:

1. A wireless access point operative to communicate with a sensor node in a wireless network, the wireless access point comprising:
   one or more processors;
   a memory;
   a wireless network interface;
   a wireless access point application, physically stored in the memory, comprising instructions operable to cause the one or more processors and the wireless access point to
   establish a wireless connection with a sensor node having a first connection parameter set;
   select a second connection parameter set that enables the sensor node to associate with a second wireless network; and
   transmit the second connection parameter set to the sensor node.

2. The wireless access point of claim 1 wherein the first and second connection parameter sets each comprise one or more of network identification, one or more encryption keys, and a frequency.

3. The wireless access point of claim 2 wherein the wireless access point application further comprises instructions operable to cause the one or more processors and the wireless access point to
   generate one or more encryption keys based on information provided by a remote network application.

4. The wireless access point of claim 1 wherein the second wireless network is a personal area network.

5. The wireless access point of claim 1 wherein the wireless access point application further comprises instructions operable to cause the one or more processors and the wireless access point to
   encrypt communications with the sensor node using the encryption key.

6. In a wireless access point operative to communicate with a sensor node in a wireless network, a method comprising:
   establishing a wireless connection with a sensor node having a first connection parameter set;
   selecting a second connection parameter set that enables the sensor node to associate with a second wireless network; and
   transmitting the second connection parameter set to the sensor node.

7. The method of claim 6 wherein the first and second connection parameter sets each comprise one or more of network identification, one or more encryption keys, and a frequency.

8. The method of claim 7 further comprising generating one or more encryption keys based on information provided by a remote network application.

9. The method of claim 6 wherein the second wireless network is a personal area network.

10. A wireless access point operative to communicate with a sensor node in a wireless network, the wireless access point comprising:
    means for establishing a wireless connection with a sensor node having a first connection parameter set;
    means for selecting a second connection parameter set that enables the sensor node to associate with a second wireless network; and means for transmitting the second connection parameter set to the sensor node.

11. A wireless node operative to communicate with a plurality of wireless access points in a wireless network, the wireless node comprising;
   one or more processors;
   a memory;
   a wireless network interface;
   a wireless network application, physically stored in the memory, comprising instructions operable to cause the one or more processors and the wireless node to
   receive a connection parameter set that enables a sensor node to associate with a wireless network corresponding to the connection parameter set;
   scan for a wireless network; and
   associate only with a wireless network corresponding to the connection parameter set.

12. The wireless node of claim 11 wherein the connection parameter set comprises one or more of network identification, an encryption key, or a frequency.

13. The wireless node of claim ii wherein the wireless network is a personal area network.

14. The wireless node of claim 11 wherein the wireless network application further comprises instructions operable to cause the processor and the wireless node to
   decrypt received wireless frames using information in the connection parameter set; and
   drop wireless frames that generate decryption errors.

15. The wireless node of claim 11 wherein the wireless network application further comprises instructions operable to cause the processor and the wireless node to
   receive a second connection parameter set that enables the sensor node to associate with a second wireless network; and
   re-configure the wireless node to scan for, and associate only with, the second wireless network.

16. In a wireless client operative to communicate with a plurality of wireless access points in a wireless network, a method comprising:
   receiving a connection parameter set that enables a Sensor node to associate with a wireless network corresponding to the connection parameter set;
   scanning for a wireless network; and
   associating only with a wireless network corresponding to the connection parameter set.

17. The method of claim 16 wherein the connection parameter set comprises one or more of network identification, an encryption key, or a frequency.

18. The method of claim 16 wherein the wireless network is a personal area network.

19. The method of claim 16 wherein the wireless network application further comprises instructions operable to cause the processor and the wireless node to
   decrypting received wireless frames using information in the connection parameter set; and
   dropping wireless frames that generate decryption errors.

20. The method of claim 16 wherein the wireless network application further comprises instructions operable to cause the processor and the wireless node to
   receiving a second connection parameter set that enables the sensor node to associate with a second wireless network; and
   re-configuring the wireless node to scan for, and associate only with, the second wireless network.

21. A wireless client operative to communicate with a plurality of wireless access points in a wireless network, the wireless client comprising:
   means for receiving a connection parameter set that enables the a sensor node to associate with a wireless network corresponding to the connection parameter set;
   means for scanning for a wireless network; and
   means for associating only with the a wireless network corresponding to the connection parameter set.

* * * * *

UNITED STATES PATENT AND TRADEMARK OFFICE
CERTIFICATE OF CORRECTION

PATENT NO. : 7,221,750 B2  Page 1 of 1
APPLICATION NO. : 11/335954
DATED : May 22, 2007
INVENTOR(S) : Deepali Apurva Brahmbhatt and Mark Enright It is certified that error appears in the above-identified patent and that said Letters Patent is hereby corrected as shown below:

Column 13, line 21, change "ii" to --11--
Column 14, line 1, change "S"ensor to --"s"--ensor Signed and Sealed this Seventh Day of August, 2007

JON W. DUDAS
*Director of the United States Patent and Trademark Office*